US006652735B2

(12) United States Patent
Degnan et al.

(10) Patent No.: US 6,652,735 B2
(45) Date of Patent: Nov. 25, 2003

(54) PROCESS FOR ISOMERIZATION DEWAXING OF HYDROCARBON STREAMS

(75) Inventors: Thomas F. Degnan, Morrestown, NJ (US); Philip J. Angevine, Woodbury, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 169 days.

(21) Appl. No.: 09/843,125

(22) Filed: Apr. 26, 2001

(65) Prior Publication Data

US 2003/0168379 A1 Sep. 11, 2003

(51) Int. Cl.[7] ............................. C10G 73/38; C07C 5/22
(52) U.S. Cl. ............... 208/27; 208/111.01; 208/111.35; 585/734; 585/736; 585/739
(58) Field of Search .................... 208/27, 111.01, 208/111.35; 585/734, 736, 739

(56) References Cited

U.S. PATENT DOCUMENTS

| 3,968,024 A | | 7/1976 | Gorring et al. | |
| 4,222,855 A | | 9/1980 | Pelrine et al. | |
| 4,247,388 A | | 1/1981 | Banta et al. | |
| 4,372,839 A | * | 2/1983 | Oleck et al. ................ | 208/59 |
| 4,419,220 A | | 12/1983 | LaPierre et al. | |
| 4,471,145 A | | 9/1984 | Chu et al. | |
| 4,575,416 A | | 3/1986 | Chester et al. ............. | 208/111 |
| 4,599,162 A | | 7/1986 | Yen | |
| 4,601,993 A | | 7/1986 | Chu et al. | |
| 4,764,266 A | | 8/1988 | Chen et al. | |
| 4,767,522 A | | 8/1988 | Yen ........................... | 208/111 |
| 4,783,571 A | | 11/1988 | Chang et al. | |
| 4,808,296 A | | 2/1989 | Chen et al. | |
| 4,820,402 A | | 4/1989 | Partridge et al. | |
| 4,851,109 A | | 7/1989 | Chen et al. | |
| 4,859,311 A | | 8/1989 | Miller | |
| 4,859,312 A | | 8/1989 | Miller | |
| 4,906,350 A | | 3/1990 | Lucien et al. | |
| 4,919,788 A | * | 4/1990 | Chen et al. .................. | 208/59 |
| 4,960,504 A | | 10/1990 | Pellet et al. | |
| 5,015,361 A | | 5/1991 | Anthes et al. | |
| 5,028,573 A | | 7/1991 | Brown et al. | |
| 5,082,984 A | | 1/1992 | Brown et al. | |
| 5,084,159 A | | 1/1992 | Abdo et al. ................ | 208/109 |
| 5,135,638 A | | 8/1992 | Miller | |
| 5,246,566 A | | 9/1993 | Miller | |
| 5,282,958 A | | 2/1994 | Santilli et al. | |
| 5,401,704 A | | 3/1995 | Absil et al. | |
| 5,462,971 A | | 10/1995 | Gaffney et al. | |
| 5,557,029 A | | 9/1996 | Lin et al. | |
| 5,833,837 A | | 11/1998 | Miller | |
| 5,885,438 A | | 3/1999 | Apelian et al. | |
| 5,951,848 A | | 9/1999 | Baker, Jr. et al. | |
| 5,965,475 A | | 10/1999 | Wittenbrink et al. | |

FOREIGN PATENT DOCUMENTS

| EP | 0183419 A2 | * | 6/1986 | |
| WO | WO 95/10578 | | 10/1994 | |
| WO | WO 9607715 A1 | * | 3/1996 | ........... C10G/69/02 |

* cited by examiner

Primary Examiner—Walter D. Griffin
(74) Attorney, Agent, or Firm—Malcolm D. Keen; Jeremy J. Kliebert

(57) ABSTRACT

A process for isomerization dewaxing of a hydrocarbon feed which includes contacting the hydrocarbon feed with a large pore size, small crystal size, crystalline molecular sieve and an intermediate pore size, small crystal size, crystalline molecular sieve to produce a dewaxed product with a reduced pour point and a reduced cloud point. In a preferred embodiment, the feed is contacted with the molecular sieves sequentially, first with the large pore sieve followed by the intermediate pore sieve.

18 Claims, No Drawings

PROCESS FOR ISOMERIZATION DEWAXING OF HYDROCARBON STREAMS

BACKGROUND OF INVENTION

The present invention relates to the hydroisomerization and dewaxing of hydrocarbon streams. In particular, the present invention relates to a catalyst combination that provides a high distillate yield with improved fluidity, viz., a reduced pour point and cloud point.

Most lubricating oil feedstocks must be dewaxed in order to manufacture finished products which will remain fluid down to the lowest temperature of use. Dewaxing is the process of separating or converting hydrocarbons which solidify readily (e.g., waxes) in petroleum fractions. Processes for dewaxing petroleum distillates have been known for a long time. As used herein, dewaxing means a reduction in at least some of the normal paraffin content of the feed. The reduction may be accomplished by isomerization of n-paraffins and/or cracking, or hydrocracking.

Dewaxing is required when highly paraffinic oils are to be used in products which need to flow at low temperatures, i.e., lubricating oils, heating oil, diesel fuel, and jet fuel. These oils contain high molecular weight straight chain and slightly branched paraffins which cause the oils to have high pour points and cloud points and, for jet fuels, high freeze points. In order to obtain adequately low pour points, these waxes must be wholly or partly removed or converted. In the past, various solvent removal techniques were used, such as MEK (methyl ethyl ketone-toluene solvent) dewaxing, which utilizes solvent dilution, followed by chilling to crystallize the wax, and filtration.

The decrease in demand for petroleum waxes as such, together with the increased demand for gasoline and distillate fuels, has made it desirable to find processes which not only remove the waxy components but which also convert these components into other materials of higher value. Catalytic dewaxing processes achieve this end by either of two methods or a combination thereof. The first method requires the selective cracking of the longer chain n-paraffins, to produce lower molecular weight products which may be removed by distillation. Processes of this kind are described, for example, in *The Oil and Gas Journal*, Jan. 6, 1975, pages 69 to 73 and U.S. Pat. No. 3,668,113. The second method requires the isomerization of straight chain paraffins and substantially straight chain paraffins to more branched species. Processes of this kind are described in U.S. Pat. No. 4,419,220 and U.S. Pat. No. 4,501,926.

To date, there have been a number of methods developed for dewaxing hydrocarbon feeds. Many dewaxing processes that are presently being used reduce the pour and cloud point of a hydrocarbon stream to acceptable levels at the price of producing more than a desirable amount of naphtha and light gas. An ideal economic fuel dewaxing process would reduce the pour point of the feed to acceptable levels while maximizing the yields of diesel fuel and heating oil and minimizing the yields of naphtha and light gas. Previous dewaxing processes have utilized zeolite hydrodewaxing catalysts including ZSM-5, ZSM-11, ZSM-12, ZSM-20, ZSM-22, ZSM-23, ZSM-34, ZSM-35, ZSM-38, ZSM-48, ZSM-50, mordenite, SAPO-11, and zeolite beta.

In order to obtain the desired selectivity, many previously known processes have used a zeolite catalyst having a pore size which admits the straight chain n-paraffins, either alone or with only slightly branched chain paraffins, but which excludes more highly branched materials, cycloaliphatics and aromatics. Zeolites such as ZSM-5, ZSM-11, ZSM-12, ZSM-23, ZSM-35 and ZSM-38 have been proposed for this purpose in dewaxing processes and their use is described in U.S. Pat. Nos. 3,894,938; 4,176,050; 4,181,598; 4,222,855; 4,229,282; and 4,247,388. A dewaxing process employing synthetic offretite is described in U.S. Pat. No. 4,259,174. A hydrocracking process employing zeolite beta as the acidic component is described in U.S. Pat. No. 3,923,641.

Isomerization Dewaxing ("IDW") technology is currently employed to lower the pour and cloud points of distillate fuel oils and gas oils to acceptable levels while minimizing the amount of naphtha and light gas. This goal is obtained through a series of mechanisms. The ideal end result is that the zeolite catalyst selectively isomerizes paraffins in the presence of aromatics. However, zeolite-based IDW also involves some conversion reactions, thereby resulting in significant yields of naphtha and $C_4$-gases.

An improved dewaxing process is disclosed in U.S. Pat. No. 4,419,220 to La Pierre et al., the entire contents of which is incorporated herein by reference. This patent discloses that hydrocarbons such as distillate fuel oils and gas oils may be dewaxed primarily by isomerization of the waxy components over a zeolite beta catalyst. The process may be carried out in the presence or absence of added hydrogen, although operation with hydrogen is preferred. This process can be used for a variety of feedstocks including light gas oils, both raw and hydrotreated, vacuum gas oils and distillate fuel oils obtained by fluid catalytic cracking (FCC).

Although catalytic dewaxing (whether shape selective dewaxing or isomerization dewaxing) is an effective process, it has some limitations. A catalytic dewaxing process removes wax, but it does not change the end point of the product to a great extent. The problem is most severe when using a shape selective zeolite catalyst, such as ZSM-5, which selectively cracks the normal and slightly branched chain paraffins, but leaves most other components untouched. Thus, the feeds to most shape selective catalytic dewaxing processes are selected based on the desired product because the end point of the product usually sets the end point of the feed. This limits the available feedstocks, since these dewaxing processes can be used to dewax heavier feedstocks, but the heavier feedstocks cannot produce light products.

U.S. Pat. No. 4,446,007 to Smith, which is incorporated herein by reference, discloses a process for producing a relatively high octane gasoline by-product from the cracking of normal paraffins by increasing the hydrodewaxing temperature to at least 360° C. within about seven days of start-up. This approach improves the economics of the dewaxing process by making the light by-products (the gasoline fraction) more valuable, but does not address the end-point problem. As a consequence, Smith does not take full advantage of the ability of the process to tolerate heavier feeds.

Other dewaxing processes reduce the pour point and cloud point of waxy feeds through the use of catalysts which isomerize paraffins in the presence of aromatics. These processes typically operate at relatively high temperatures and pressures, which results in extensive cracking and thereby degrades useful products to less valuable light gasses.

In light of the disadvantages of the conventional processes for improving distillate yield, there is a need for a new process that provides a high distillate yield with a reduced pour point and cloud point.

SUMMARY OF THE INVENTION

The present invention is a process for the isomerization dewaxing of a hydrocarbon feed. The process includes contacting the hydrocarbon feed with a catalyst containing a large pore crystalline molecular sieve having a Constraint Index of less than 2, an alpha value of less than 100 and an ultimate crystal size of less than 1 micron and a catalyst containing an intermediate pore crystalline molecular sieve having a Constraint Index greater than 2, an alpha value less than 100, an ultimate crystal size of less than 1 micron and an unidimensional or a non-intersecting two dimensional pore structure; under hydroprocessing conditions to produce a dewaxed product having improved fluidity. It is preferred that the process be carried out at superatmospheric hydrogen partial pressure.

The hydrocarbon feed preferably contains waxy components having a cloud point greater than about 0° C., an ASTM D2887 end boiling point exceeding 275° C., and a pour point greater than 5° C. Preferably, the pour point of the feedstock is reduced by at least 5° C.

The large pore crystalline molecular sieve is preferably selected from the group consisting of zeolite beta, mordenite, USY, ZSM-20, ZSM-4 (omega), zeolite L, VPI-5, SAPO-37, MeAlPO-37, AlPO-8, cloverite, CIT-1 and mixtures thereof. More preferably, the large pore crystalline molecular sieve is zeolite beta.

The intermediate pore crystalline molecular sieve is preferably selected from the group consisting of ZSM-22, ZSM-23, ZSM-35, ZSM-48, ZSM-57, MCM-22, SAPO-11, SAPO-5, MeAlPO-11, MeAlPO-5 and mixtures thereof More preferably, the intermediate pore crystalline molecular sieve is selected from the group consisting of ZSM-23, ZSM-48 and SAPO-11.

Preferably, the improved fluidity is manifested in a product having a reduced pour point and cloud point relative to the feed. Preferably, the pour point of the feedstock is reduced by at least 5° C.

In one embodiment of the invention, the hydrocarbon feed is catalytically hydrotreated prior to contacting the catalyst system of the invention.

In another embodiment, the large pore crystalline molecular sieve and intermediate pore crystalline molecular sieve isomerization dewaxing catalysts are mixed together, combined to form a single combination catalyst by coextrusion or another forming method, stacked in a layered configuration, or contained in separate reactors.

Preferably, the process of the present invention is carried out with a ratio of large pore crystalline molecular sieve to intermediate pore crystalline molecular sieve from about 5:95 by weight to about 95:5 by weight.

The inventive process can be carried out in a reactor selected from the group consisting of a co-current flow gas-liquid reactor, a countercurent flow gas-liquid reactor, a sequential two stage reactor and a multiple reactor system.

The overall distillate yield of the inventive process preferably is greater than about 30% by weight.

The inventive process is preferably carried out under hydroprocessing conditions which include a temperature of from about 200° C. to about 485° C., of a hydrogen partial pressure of from about 1375 kPa to about 21,000 kPa, a hydrogen circulation rate of from about 100 to about 10,000 scf $H_2$/BBL, and a liquid hourly space velocity (LHSV) of from about 0.1 to about 20 $hr^{-1}$ based on the total volume of catalyst.

The large pore crystalline molecular sieve and/or intermediate pore crystalline molecular sieve are preferably combined with a Group VIII metal selected from the group consisting of Pt, Pd, Ir, Rh, Ru, Co, Fe, Ni, and Os, or a combination of these metals. Preferred metals include Pt, Pd or a Pt-Pd combination.

In a particularly preferred embodiment, the hydrocarbon feed is contacted with the catalysts in an order starting with the large pore crystalline molecular sieve followed by the intermediate pore crystalline molecular sieve.

It is preferred that the large pore crystalline molecular sieve and/or the intermediate pore crystalline molecular sieve are combined with a binder material selected from the group consisting of clay, silica, alumina, silica-alumina, silica-magnesia, silica-zirconia, silica-thoria, silica-beryllia, silica-titania, silica-alumina-thoria, silica-alumina-zirconia, silica-alumina-magnesia, and silica-magnesia-zirconia. In a preferred embodiment, the binder material is alumina.

Preferably, the large pore crystalline molecular sieve and/or the intermediate pore crystalline molecular sieve is/are combined with Pt, Pd or a Pt—Pd combination and an alumina binder.

The advantages of the present invention is that at the same product pour point, more distillate range products can be produced than expected by contacting a hydrocarbon feed with a combination of the large pore crystalline molecular sieve and the intermediate pore crystalline molecular sieve than by using these two molecular sieves separately. A further improvement in distillate yield than expected can be realized by contacting the feed sequentially, first with the large pore molecular sieve followed by the intermediate pore sieve.

Additional objects, advantages and novel features of the invention will be set forth in part in the description and examples which follow, and in part will become apparent to those skilled in the art upon examination of the following, or may be learned by practice of the invention. The objects and advantages of the invention may be realized and attained by means of the instrumentalities and combinations particularly pointed out in the appended claims.

DETAILED DESCRIPTION OF THE INVENTION

In the present invention, heavy hydrocarbon streams are processed using a catalyst system containing a larger pore size isomerization catalyst, preferably containing zeolite beta or USY, and a smaller pore size isomerization catalyst, preferably containing ZSM-23, ZSM-48 or SAPO-11. The term "catalyst system" refers to isomerization dewaxing catalyst(s) containing a combination of the large pore crystalline molecular sieve and the intermediate pore crystalline molecular sieve. The combination can be in the form of separate catalysts, one containing the large pore sieve and one containing the intermediate pore sieve, that are mixed together; a single combination catalyst containing both the large pore and intermediate pore sieves; a stacked or layered configuration, where the different sieves are contacted sequentially; or a multiple reactor configuration, where the sieves are contained in separate reactors and contacted sequentially.

Preferably, the feedstream is processed in series, first by contacting with the larger pore size catalyst, followed by contacting with the smaller pore size catalyst. One configuration for processing the feedstream in series is to stack the two beds of catalyst with the bed containing the larger pore molecular sieve on top of the bed containing the intermediate pore molecular sieve. The more preferred configuration is to place the two different molecular sieve catalysts into two different reactors so that the operating temperatures can be controlled independently. The flow pattern would then be sequential with the oil flowing first over the larger pore molecular sieve catalyst and then over the intermediate pore catalyst. This maximizes distillate yields (distillate yield is that portion of the product that boils between 300° F. and 750° F. (145–400° C.)) while producing a quality fuel with an acceptable pour point and cloud point. The isomerization dewaxing catalysts reduce the pour point of a fuel at lower conversion resulting in more of the desirable distillate products, while producing fewer unwanted light gases and naphtha. The sequential combination of catalysts used in the present invention, particularly zeolite beta followed by ZSM-23, ZSM-48 or SAPO-11, produces distillate yields that are significantly higher than the yields produced by using either of these zeolites alone or in a non-sequential mixture thereof.

As used in describing the present invention, the cloud point of an oil is the temperature at which paraffin wax or other solid substances begin to crystallize or separate from the solution, imparting a cloudy appearance to the oil when the oil is chilled under prescribed conditions. The conditions for measuring cloud point are described in ASTM D-2500. The pour point of an oil is the lowest temperature at which oil will pour or flow when it is chilled without disturbance under definite conditions. The conditions for measuring pour point are described in ASTM D-97.

The process of the present invention dewaxes hydrocarbon streams, such as hydrocracked bottoms, diesel fuels, and hydrotreated vacuum gas oils. This process operates by contacting the hydrocarbon feed stream with a large pore crystalline molecular sieve having a Constraint Index less than 2, an alpha valve less than 100 and an ultimate crystal size of less than 1 micron, and with an intermediate pore crystalline molecular sieve having a Constraint Index greater than 2, an alpha value of less than 100, an ultimate crystal size less than 1 micron and having a unidimensional or a non-intersecting two dimensional pore structure. In a preferred embodiment, the process operates by contacting the hydrocarbon streams with a noble metal/zeolite beta catalyst followed by a nobel metal/(ZSM-23, ZSM-48 or SAPO-11) catalyst to produce petroleum oils with acceptable pour and cloud points while maximizing the yield of distillate boiling range materials. The Pt/ZSM-23, Pt/ZSM-48 and Pt/SAPO-11 catalysts are very effective at reducing the pour points of hydrocracked bottoms, diesel fuels and treated straight run gas oils at low conversion. When ZSM-23, ZSM-48 or SAPO-11 are used in sequence with zeolite beta, the distillate yields can be maximized while the light gas and naphtha yields are minimized.

The preferred Pt/ZSM-23, Pt/ZSM-48 and Pt/SAPO-11 catalysts have significant dewaxing capabilities. At low 650° F.+ conversions (between 10 and 20 wt %), the product pour point is from 30 to 50° C. lower than the 100% Pt/zeolite beta catalyst and 50–80° C. lower than the 100% Pt/USY catalyst. Another advantage of the ZSM-23, ZSM-48 and SAPO-11 catalysts are the low naphtha and light gas yields when compared to the Pt/zeolite beta catalyst. However, the activity of these intermediate pore molecular sieves would be lower than the conventional catalysts in terms of both conversion and dewaxing. Distillate yields (330–730° F.) are also lower for these catalyst compared to the Pt/zeolite beta. The disclosure of ZSM-23 in U.S. Pat. Nos. 4,076,842; 4,490,342, 4,531,012; 4,619,820 and 5,405,596 is incorporated herein by reference. The disclosure of ZSM-48 in U.S. Pat. Nos. 4,397,827; 4,423,021; 4,448,675; 5,075,269; and 5,282,958; and the disclosure of SAPO-11 in U.S. Pat. No. 4,440,871 are also incorporated herein by reference.

It has been found that when used in series with the Pt/zeolite beta catalyst, the distillate yields of the Pt/ZSM-23, Pt/ZSM-48 and Pt/SAPO-11 catalysts are greatly improved. Preferably, the process of the present invention is carried out with a ratio of zeolite beta to the intermediate pore molecular sieve, i.e., ZSM-23, ZSM-48 or SAPO-11, from about 5:95 by wt to about 95:5 by wt. The overall distillate yield of the inventive process is at least 5% and preferably greater than about 30 wt %.

Catalysts

The large pore crystalline molecular sieve according to the invention has a Constraint Index of less than 2, an alpha value less than 100 and an ultimate crystal size of less than 1 micron, preferably less than about 0.5 microns. The method by which the Constraint Index is determined is fully described in U.S. Pat. No. 4,016,218, which is incorporated herein by reference.

The alpha value is an approximate indication of the catalytic cracking activity of the catalyst compared to a standard catalyst. The alpha test gives the relative rate constant (rate of normal hexane conversion per volume of catalyst per unit time) of the test catalyst relative to the standard catalyst which is taken as an alpha of 1 (Rate Constant =0.016 sec–1). The alpha test is describe in U.S. Pat. No. 3,354,078 and in J. Catalysis, 4, 527 (1965); 6, 278 (1966); and 61, 395 (1980), to which reference is made for a description of the test. The experimental conditions of the test used to determine the alpha values referred to in this specification include a constant temperature of 538° C. and a variable flow rate as described in detail in J. Catalysis, 61, 395 (1980).

Small crystal (i.e., less than 1 micron) large pore molecular sieves according to the invention provide improved feedstock dewaxing via hydroisomerization over large crystal (>1 micron) large pore molecular sieves. U.S. Pat. No. 5,401,704 provides a good example of what is meant by crystal sizes less than 1 micron and serves as a good example of how small crystal large pore molecular sieves differ from standard, larger crystal molecular sieves, the entire contents of which is incorporated herein by reference.

Although the use of all large pore molecular sieves (i.e., those that have Constraint Indices less than two) according to the invention are contemplated, the large pore sieves are preferably selected from the group consisting of zeolite beta, mordentine, Y, ZSM-20, ZSM-4 (omega), zeolite L, VPI-5, SAPO-37, MeAlPO-37, AlPO-8 and cloverite.

Of these, zeolites beta and Y are the preferred large pore crystalline molecular sieves. Large pore zeolites such as beta and Y have a pore size sufficiently large enough to admit most of the components normally found in a feed stock, and generally have a pore size greater than seven Angstroms.

Preferably, the crystal size of the large pore molecular sieve is less than about 0.5 microns, more preferably less than about 0.2 microns. Of particular interest are smaller crystal versions of zeolites Y, beta, ZSM-20, mordenite, zeolite L, and zeolite Omega.

Methods for preparing zeolite Y are well known. Small crystal Y may be prepared by known methods including, for example, those methods describe in U.S. Pat. Nos. 3,864, 282; 3,755,538 and 3,516,786; the entire contents of which are incorporated herein by reference. Zeolite beta is normally formed as a small crystal (>0.1 microns) when synthesized using basic conditions. Methods for synthesizing small crystal versions of the other aforementioned large pore zeolites have been published and are known in the art.

Of specific interest are zeolites Y and beta. Various forms of small crystal Y are useful in this invention. These include dealuminated Y where dealumination has been effected by steaming or acid extraction, ultrastable Y, also known as USY and various forms of cation exchanged Y and USY including, for example rare earth exchanged Y or ultrastable Y (i.e., REY or REUSY). The zeolite Y used in the hydroisomerization process may have a unit cell size (USC) of, for example, 24.6 Angstroms or less, e.g., 24.60 to 24.25 Angstroms. USY zeolites having a low unit cell size (USC) of, for example, 24.35 to 24.25, are particularly advantageous.

The ultrastable form of the Y-type zeolite, USY, can be prepared by successively base exchanging a Y-type zeolite with an aqueous solution of an ammonium salt, such as ammonium nitrate, until the alkali metal content of the Y-type zeolite is reduced to less than 4.0 wt %. The base exchanged zeolite is then calcined at a temperature of 540° C. to 800° C. for several hours, cooled and successively base exchanged with an aqueous solution of an ammonium salt until the alkali metal content is reduced to less than 1.0 wt %. This is followed by a final washing and calcination again at a temperature of 540° C. to 800° C. to produce an ultrastable zeolite Y. The sequence of ion exchange and heat treatment results in the substantial reduction of the alkali metal (e.g., Na) content of the original zeolite and results in a unit cell shrinkage which is believed to lead to the ultra high stability of the resulting Y-type zeolite.

The ultrastable zeolite Y may then be extracted with acid to produce a highly siliceous form of the zeolite.

The large pore zeolite catalyst used in this process will preferably also contain a hydrogenation metal, which may be a noble metal or metals, or a non-noble metal or metals. Suitable noble metals include the Group VIII noble metals, such as platinum and other members of the platinum group, such as iridium, palladium, and rhodium and combinations of these metals. Suitable non-noble metals include those of Groups VA, VIA, and VIIIA of the Periodic Table. Preferred non-noble metals are chromium, molybdenum, tungsten, cobalt, nickel, and combinations of these metals including cobalt-molybdenum, nickel-tungsten, nickel-molybdenum, and cobalt-nickel-tungsten. The non-noble metals may be pre-sulfided prior to use by exposure to a sulfur-containing gas such as hydrogen sulfide at an elevated temperature to convert the oxide form to the corresponding sulfide form of the metal.

The metal may be incorporated into the catalyst by any suitable method such as by impregnation or ion exchange into the zeolite. The metal may be incorporated in the form of a cationic, anionic, or neutral complex. Cationic complexes of the type $Pt(NH_3)_4^{++}$ will be found convenient for exchanging metals into the zeolite. Anionic complexes such as the molybdate or metatungstate ions are also useful for impregnating metals onto the catalysts.

The amount of the hydrogenation metal is typically from 0.01 to 20 percent by weight, nominally 0.1 to 15 percent by weight based on the weight of the zeolite and the binder plus the weight of the hydrogenation metal. However, this will, of course, vary with the nature of the component, less of the highly active noble metals, particularly platinum or palladium, being required compared to the less active non-noble metals.

The intermediate pore crystalline molecular sieve according to the invention has a Constraint Index greater than 2, an alpha value less than 100, an ultimate crystal size of less than 1 micron, preferably less than about 0.5 microns, and has a unidimensional or a non-intersecting two dimensional pore structure. Examples of unidimensional intermediate pore molecular sieves include ZSM-22, ZSM-23, ZSM-48, SAPO-11, SAPO-5, MeAlPO-11 and MeAlPO-5 and an example of a non-intersecting two-dimensional intermediate pore molecular sieve is ZSM-35 (synthetic ferrierite).

The preferred intermediate pore crystalline molecular sieve is selected from the group consisting of ZSM-23, ZSM-48 and SAPO-11. ZSM-23, ZSM-48 and SAPO-11 are medium pore crystalline molecular sieves which can be identified in terms of moles of an oxide per 100 moles of silica and by specified x-ray powder diffraction patterns as described in U.S. Pat Nos. 4,076,842; 4,397,827; and 4,440,871; respectively, the entire contents of which are incorporated by reference.

The crystal size of the intermediate pore crystalline molecular sieve is also preferably less than about 0.5 microns, more preferably less than about 0.2 microns. The intermediate pore sieve is also preferably combined with a metal component as discussed with reference to the large pore sieves.

Both the large pore molecular sieve (e.g., zeolite beta) and intermediate pore crystalline molecular sieve (e.g., ZSM-23, ZSM-48 and SAPO-11) are preferably combined with a Group VIII metal selected from the group consisting of Pt, Pd, Ir, Rh, Ru, Co, Fe, Ni, and Os, and can use two or more metals in combination.

It is also desirable to incorporate the molecular sieve (i.e., the large pore and/or intermediate pore sieve) in a binder (or matrix) material. The binder materials include, but are not limited to, inorganic materials such as clay, silica and/or metal oxides. The metal oxide can be a metal oxide binder material such as alumina ($Al_2O_3$), silica-alumina, silica-magnesia, silica-zironcia, silica-thoria, silica-berylia, silica-titania, as well as ternary compositions such as silica-alumina-thoria, silica-alumina-zirconia, silica-alumina-magnesia, and silica-magnesia-zirconia. In one embodiment, the catalysts are ZSM-23, ZSM-48 or SAPO-11, and zeolite beta, which are both combined with alumina, and formed into a useable shape by methods such as extrusion or tabletting.

Feedstock

The present process may be used to dewax a variety of feedstocks ranging from relatively light distillate fractions up to high boiling stocks such as whole crude petroleum, cycle oils, gas oils, vacuum gas oils, furfural raffinates, deasphalted residues and other heavy oils. The feedstock will normally be a $C_{10}$+ feedstock since lighter oils will usually be free of significant quantities of waxy components. However, the process is particularly useful with waxy distillate stocks to produce diesel fuels, gas oils, kerosenes, jet fuels, lubricating oil stocks, heating oils and other distillate fractions whose pour point and viscosity need to be maintained within certain specification limits. Lubricating oil stocks will generally boil above 230° C. (450° F.), more usually above 315° C. (600° F.).

Hydrocracked stocks can be used as a feedstock, as well as other distillate fractions which contain significant amounts of waxy n-paraffins produced by the removal of polycyclic aromatics. The feedstock for the present process will normally be a $C_{10}$+ feedstock, preferably a $C_{16}$+ feedstock, containing paraffins, olefins, naphthenes, aromatics, and heterocyclic compounds, with a substantial proportion of high molecular weight n-paraffins and slightly branched paraffins which contribute to the waxy nature of the feedstock.

The waxy feeds which are most benefited by the practice of the present invention will have relatively high pour points, usually above 80° F. (26.7° C.), but feeds with pour points ranging from 50° F.(10° C.) to 150° F. (65.6° C.) may also be used.

Hydroprocessing Conditions

The feedstock is contacted with the isomerization dewaxing catalysts in the presence of hydrogen under hydroprocessing conditions of elevated temperature and pressure. Conditions of temperature, pressure, space velocity, hydrogen to feedstock ratio and hydrogen partial pressure which are similar to those used in conventional isomerization dewaxing operations can be employed herein.

Process temperatures of from about 200° C. to about 485° C. can be used although temperatures above about 420° C. will normally not be employed as the reactions become unfavorable at temperatures above this point. Total pressure is in the range from about 344 to about 17,200 kPa with pressures above about 1375 kpa being preferred. The process is operated in the presence of hydrogen with hydrogen partial pressures of from about 300 kPa to about 21,000 kPa with pressures of from about 1375 to about 6900 being preferred. The hydrogen to feedstock ratio (hydrogen circulation rate) is normally of from about 100 to about 10,000 scf $H_2$/BBL. The space velocity of the feedstock is normally of from about 0.1 to about 20 LHSV and, preferably, of from about 0.3 to about 4.0 LHSV.

Several types of reactors can be used to practice the present invention. The most common configuration is a downflow trickle bed (i.e., cocurrent gas-liquid. downflow reactor). Other reactors which can be used to practice the present invention include, but are not limited to, a cocurrent flow gas-liquid reactor, a countercurrent flow gas-liquid reactor, an ebullated bed reactor, a moving bed reactor, and a sequential two stage reactor wherein a gas or a liquid of the hydrocarbon feed cascades from a first stage to a second stage. The primary advantage of a countercurrent reactor is the removal of gas-phase heteroatom contaminants by countercurrent gas flow, thereby improving catalyst performance. In an ebullated bed reactor or a moving bed reactor, fresh catalyst can be continuously added and spent catalyst can be continuously withdrawn to improve process performance.

Within the same reactor, both small and large pore size dewaxing catalysts can be located in separate layers. In a preferred embodiment, zeolite beta is in the top layer; and one of ZSM-23, ZSM-48 or SAPO-11 is in the bottom layer. The ratio of intermediate pore to large pore size dewaxing catalysts can be varied to obtain the desired yield of distillates. The ratio of the catalysts will also vary based upon the feedstock and specific catalysts chosen. In general, the ratio of zeolite beta to intermediate pore sieve can vary over a wide range (i.e., from about 5:95 to about 95:5). The preferred ratio is dependent upon the refiner's processing objective of tailoring dewaxing versus conversion.

In a preferred embodiment, the hydrocarbon feed is first passed over the catalyst in a first reactor containing the large pore size zeolite. The discharge from the first reactor is then passed over the smaller pore zeolite in a second reactor. More than two reactors in series can also be used. Ideally, the hydrocarbon feed passes over zeolite beta in the first reactor and subsequently passes over ZSM-23, ZSM-48 or SAPO-11 in a second reactor. The temperature of each reactor can be controlled and optimized for each catalyst. The temperature for the first reactor containing zeolite beta can suitably be of from about 200° C. (392° F.) to about 485° C. (905° F.), preferably of from about 250° C. (482° F.) to about 420° C. (788° F.). The temperature for the second reactor containing ZSM-23, ZSM-48 or SAPO-11 can be of from about 220° C. (428° F.) to about 485° C. (905° F.), preferably of from about 250° C. (482° F.) to about 400° C. (752° F.).

Various reactor configurations can be used for the inventive process. The feedstock can contact a fixed bed of catalyst, a fluidized bed or an ebullating bed. A simple configuration is a trickle-bed operation in which the liquid feed is allowed to trickle through a stationary fixed bed. Another reactor configuration employs a countercurrent process, i.e., the hydrocarbon feed flows down over a fixed catalyst bed while the $H_2$ flows in the upward direction. The countercurrent configuration has the advantage that $H_2S$ and/or $NH_3$ are removed overhead, and the noble metal catalyst is less impacted by these poisons.

A preliminary hydrotreating step to remove nitrogen and sulfur and to saturate aromatics to naphthenes without substantial boiling range conversion will usually improve catalyst performance and enable lower temperatures, higher space velocities, lower pressures or combinations of these conditions to be employed.

The present process proceeds mainly by isomerization of the n-paraffins to form branched chain products, with but a minor amount of cracking and the products will contain only a relatively small proportion of gas and light ends up to $C_5$. Because of this, there is less need for removing the light ends which could have an adverse effect on the flash points of the product, as compared to processes using other catalysts. However, since some of these volatile materials will usually be present from cracking reactions, they can be removed by distillation.

Products

The process of the present invention is selective for middle distillates. Middle distillates boil in the range of from about 165° C. to about 345° C. (about 330° F. to about 650° F.) and are used to provide distillate fuels including diesel and kerosene-type jet fuels and heating oils including No. 1 and No. 2 fuel oils. By isomerizing the waxy paraffins, premium middle distillate is produced. The product is highly iso-paraffinic with low pour point, suitable for jet fuel and diesel fuel.

EXAMPLE 1

This example illustrates the preparation of a ZSM-48 containing catalyst in accordance with the invention. First, 325 parts by weight of a calcined H-form ZSM-48 was combined with 225 parts by weight of pseudoboehmite alumina. The ZSM-48 crystal size was 0.02 to 0.05 microns in diameter as determined by transmission electron microscopy. The dry mixture was combined with 130 parts by weight water to make a paste. The paste was extruded to produce a 1/16 inch 65% ZSM-48/35% $Al_2O_3$ extrudate. The extrudate was calcined in air at 538° C. for three hours and then cooled to room temperature. The alpha value of the ZSM-48 catalyst was 35. One hundred parts by weight of the calcined extrudate was impregnated with $Pt(NH_3)_4(NO_3)_2$ using an aqueous incipient wetness technique to produce a Pt/ZSM-48/$Al_2O_3$ catalyst containing 0.6 wt % Pt.

EXAMPLE 2

This example illustrates the prepartaion of zeolite beta containing catalyst in accordance with the invention. First, 450 parts by weight of a calcined H-form zeolite beta was combined with 315 parts by weight of a commercially produced pseudoboehmite alumina. The zeolite beta crystal size was 0.01 to 0.03 microns in diameter as determined by transmission electron microscopy. The dry mixture was combined with water to make a paste. The paste was extruded to produce a 1/16-inch 65% zeolite beta/35% $Al_2O_3$ extrudate. This extrudate was calcined in air at 538° C. for three hours and then cooled to room temperature. The alpha value of the zeolite beta catalyst was 65. Two hundred parts by weight of the calcined extrudate was impregnated with $Pt(NH_3)_4(NO_3)_2$ using an aqueous incipient wetness technique to produce a Pt/Beta/$Al_2O_3$ catalyst containing 0.6 wt % Pt.

EXAMPLE 3

This example illustrates the typical process conditions used to evaluate the hydrodewaxing activities of the large pore and intermediate pore crystalline molecular sieve catalysts.

A commercial light neutral raffinate was used to evaluate the hydrodewaxing activities of the ZSM-48 and zeolite beta catalysts described in Examples 1 and 2. The properties of the raffinate are summarized in Table 1.

TABLE 1

PROPERTIES OF LIGHT NEUTRAL RAFFINATE

| PROPERTY | VALUE |
|---|---|
| Pour Point, ° F. | 100 |
| K.V. @100° F., cs | 5.513 |
| K.V. @300° F., cs | 2.463 |
| Gravity, API | 31.9 |
| Sulfur, wt % | 0.81 |
| Nitrogen, ppm | 39 |
| Hydrogen, wt % | 13.68 |
| Aniline Point, ° F. | 30.5 |
| Furfural, ppm | 5 |

In a typical run, catalyst was charged to a tubular reactor situated in a vertical furnace. Catalysts were reduced in flowing hydrogen by heating to 660° F. for three hours and then pressure was increased to 400 psig. In each run, the catalyst was held at 660° F. for three hours at 400 psig and then cooled to 500° F. The light neutral raffinate was admitted to the reactor along with 2500 scf $H_2$/BBl and the temperature was raised at 10° F. increments over the next several days to span the range of temperatures and pour points. The products were vacuum distilled to produce a 650° F.+ product, and then were submitted for kinematic viscosity and pour point measurements.

EXAMPLE 4

In this example, a ZSM-48 catalyst was used to dewax a light neutral raffinate. Ten cc (5.2g) of Pt/ZSM-48/$Al_2O_3$ catalyst was charged to a 0.5-inch diameter stainless steel tubular reactor, dried and reduced as described in Example 3. A light neutral raffinate, as described in Example 3, was dewaxed by passing the oil over the catalyst at 400 psig, 0.5 LHSV, and 2500 scf $H_2$/BBL over a range of temperatures starting at 600° F. (315° C.) and ranging up to 700° F. (371° C.). The 650° F. (343° C.) product yield in wt %, the product pour points, and the viscosity index versus reactor temperatures are shown in Table 2.

TABLE 2

DEWAXING USING A Pt/ZSM-48/$Al_2O_3$ CATALYST

| Reactor Temperature, ° F. | Product 650° F. + Yield, wt % | Product Pour Pt., ° F. | Viscosity Index |
|---|---|---|---|
| 645 | 89.1 | 40 | 104 |
| 653 | 88.2 | 30 | 103 |
| 661 | 87.3 | 20 | 101 |
| 669 | 86.2 | 10 | 100 |

The Pt/ZSM-48/$Al_2O_3$ catalyst was able to dewax the light neutral raffinate as shown by the high distillate yields with reduced pour points.

EXAMPLE 5

In this example, a zeolite beta catalyst was used to dewax a light neutral raffinate. Ten cc (5.3g) of Pt/Beta/$Al_2O_3$ catalyst was charged to 0.5-inch diameter stainless steel tubular reactor. The catalyst was dried and reduced as described in Example 3. A light neutral raffinate, as described in Example 3, was dewaxed by passing the oil over the catalyst at 400 psig, 0.5 LHSV, and 2500 scf $H_2$/BBL over a range of temperatures starting at 600° F. (315° C.) and ranging up to 720° F. (382° C.). The 650° F.+ (343° C.+) product yield in wt %, the product pour point and the viscosity index versus reactor temperature are shown in Table 3.

TABLE 3

DEWAXING USING A Pt/BETA/$Al_2O_3$ CATALYST

| Reactor Temperature, ° F. | Product 650° F. + Yield, wt % | Product Pour Point, ° F. | Viscosity Index |
|---|---|---|---|
| 680 | 89.2 | 60 | 101 |
| 700 | 85.2 | 45 | 100 |
| 720 | 82.0 | 40 | 100 |

A review of Table 3 reveals that a product pour point of 40° F. (4.4° C.) and a product yield of 82.0wt % was achieved using the Pt/Beta/$Al_2O_3$ catalyst at an temperature of 720° F. (302° C.).

EXAMPLE 6

In this example, a Pt/ZSM-48/$Al_2O_3$ catalyst followed by a Pt/Beta/$Al_2O_3$ catalyst was used to dewax a light neutral raffinate. Five cc (2.6g) of Pt/Beta/$Al_2O_3$ catalyst was charged to a 0.5-inch diameter stainless steel tubular reactor. This was followed by charging five cc (2.6g) of Pt/ZSM-48/$Al_2O_3$ catalyst on top of the Pt/Beta/$Al_2O_3$ catalyst so that the oil first contacts the Pt/ZSM-48/$Al_2O_3$ catalyst. The 10 cc, dual catalyst bed was dried and reduced as described in Example 3. A light neutral raffinate, as described in Example 3, was dewaxed by passing the oil over the dual catalyst bed at 400 psig, 0.5 LHSV (based on the combined catalyst bed), and 2500 scf $H_2$/BBL over a range of temperatures from 600° F. (315° C.) to 700° F. (371° C.). The 650° F. (343° C.) product yield in wt. %, the product pour points and the viscosity index versus reactor temperatures are shown in Table 4.

TABLE 4

DEWAXING USING A Pt/ZSM-48/Al$_2$O$_3$ CATALYST
FOLLOWED BY Pt/Beta/Al$_2$O$_3$ CATALYST

| Reactor Temperature, °F. | Product 650° F. + Yield, wt % | Product Pour Points, °F. | Viscosity Index |
|---|---|---|---|
| 662 | 90.1 | 40 | 104 |
| 672 | 89.3 | 30 | 103 |
| 681 | 88.5 | 20 | 101 |
| 691 | 87.4 | 10 | 100 |

Compared to the Pt/ZSM-48/Al$_2$O$_3$ catalyst in Example 4, the combination of the Pt/ZSM-48/Al$_2$O$_3$ catalyst followed by the Pt/Beta/Al$_2$O$_3$ catalyst requires a higher temperature (i.e., 662° F. or 350° C. versus 645° F. or 341° C.) to achieve the same product pour point. However, the product yields at equivalent pour points are approximately 1 wt % higher when the combination is used.

EXAMPLE 7

In this example, a Pt/Beta/Al$_2$O$_3$ catalyst followed by a Pt/ZSM-48/Al$_2$O$_3$ was used to effectively dewax a light neutral raffinate. Five cc (2.6g) of Pt/ZSM-48/Al$_2$O$_3$ catalyst was charged to a 0.5-inch diameter stainless steel tubular reactor. This was followed by charging five cc (2.6g) of Pt/Beta/Al$_2$O$_3$ catalyst on top of the Pt/ZSM-48/Al$_2$O$_3$ catalyst so that the oil first contacts the Pt/Beta/Al$_2$O$_3$ catalyst. The 10 cc dual catalyst was dried and reduced as described in Example 3. A light neutral raffinate, as described in Example 3, was dewaxed by passing the oil over the dual catalyst bed at 400 psig, 0.5 LHSV (based on the combined catalyst bed), and 2500 scf H$_2$/BBL over a range of temperatures from 600° F. (315° C.) to 700° F. (371° C.). The 650° F.+ (343° C.+) product yield in wt %, the product pour points and the viscosity index versus reactor temperatures are shown in Table 5.

TABLE 5

DEWAXING USING A Pt/BETA/Al$_2$O$_3$ CATALYST
FOLLOWED BY A Pt/ZSM-48/Al$_2$O$_3$ CATALYST

| Reactor Temperature, °F. | Product 650° F. + Yield, wt % | Product Pour Point, °F. | Viscosity Index |
|---|---|---|---|
| 642 | 92.1 | 40 | 104 |
| 650 | 91.3 | 30 | 104 |
| 658 | 90.7 | 20 | 103 |
| 666 | 89.9 | 10 | 102 |

Compare to the dual catalyst system in Example 6, the combination of the Pt/Beta/Al$_2$O$_3$ catalyst followed by a Pt/ZSM-48/Al$_2$O$_3$ catalyst requires a lower temperature to achieve the same product pour point. Moreover, product yields are improved by approximately 1.5 to 2.0 wt % at equivalent pour points. Both of these benefits are unexpected. This suggests that the sequencing of the catalysts is important and that the Pt/Beta/Al$_2$O$_3$ catalyst followed by the Pt/ZSM-48/Al$_2$O$_3$ catalyst is preferred over the sequence of catalysts used in Example 6.

EXAMPLE 8

This example describes the preparation of a small crystal USY catalyst. The small crystal sodium type-Y (NaY) was prepared according to U.S. Pat. No. 3,755,538. A solution of sulfuric acid was prepared by mixing 68 grams of concentrated sulfuric acid with 200 ml of water. This solution was then added to a solution of 1,096 grams of sodium silicate solution (Q-Brand, PQ Corp.) diluted with 400 ml of water. Next, a solution comprising 149 grams of sodium aluminate diluted with 170 grams of water was added to the sulfuric acid/sodium silicate mixture. Finally, 605 grams of seeds, the preparation of which is taught in U.S. Pat. No. 3,574,538, was added to the mixture. The resulting mixture of all of the above chemicals had the effective slurry oxide ratio of 6.5 Na$_2$O: 1.0 Al$_2$O$_3$: 16 SiO$_2$: 280 H$_2$O. This mixture was poured into a two liter polypropylene bottle, which was loosely capped. The bottle was then placed into an oven and heated to 100° C. After the bottle was heated for 12 hours in the oven, the slurry was filtered in a Buchner filter and the filter cake was rinsed three times with hot water to remove soluble silica. The filter cake was dried at 105° C. and a portion was analyzed by x-ray diffraction and by Scanning and Transmission Electron Microscopy (SEM and TEM). The product was found to be a highly crystalline sodium type-Y zeolite having a unit cell size of 24.66 Angstroms and a SiO$_2$/Al$_2$O$_3$ ratio of 5.0 by chemical analysis. The particle size of this zeolite Y was analyzed by SEM and TEM to be 0.06–0.08 micrometers in diameter.

EXAMPLE 9

This example describes the preparation of an ammonium exchanged, ultrastabilized small crystal NaY zeolite (USY catalyst). A 250 gram sample of the zeolite Y from Example 8 was ammonium exchanged at room temperature by slurrying the zeolite in 1.0 M NH$_4$NO$_3$ for one hour, filtering, and then repeating the exchange. The resulting NH$_4$ exchanged Y zeolite was then steamed in an open crucible for 3 hours at 510° C. in 100% steam at atmospheric pressure. The ammonium exchange procedure was repeated and the zeolite was again steamed at 510° C. for three hours. The resulting zeolite had a unit cell size of 24.35 Å and a sodium content of 0.16%.

EXAMPLE 10

This example describes the preparation of a small crystal USY hydrocracking catalyst. The small crystal USY catalyst was prepared by admixing 200 grams of the USY from Example 9 with pseudoboehite (Condea, Pural SB) to produce a 50% small crystal USY/50% Alumina mixture on a bone dry basis. The resulting mixture was transformed into an extrudable paste by mulling and adding deionized water. The resulting paste was extruded to yield a 1/16-inch diameter extrudate, which was dried at 121° C. for 12 hours and subsequently calcined at 538° C. for three hours in flowing air. The resulting catalyst was impregnated with an ammonium metatungstate solution, dried at 121° C. for three hours and then calcined in flowing air for 3 hours at 538° C. The catalyst was subsequently impregnated with a nickel nitrate hexahydrate solution, dried at 121° C. and calcined a final time at 538° C. in flowing air for three hours. The physical and chemical properties of the finished small crystal USY catalyst are shown in Table 6.

TABLE 6

SMALL CRYSTAL USY CATALYST PROPERTIES

| | |
|---|---|
| Zeolite/Al$_2$O$_3$ ratio, wt | 50:50 |
| Zeolite Crystal Size, microns | 0.06 to 0.08 |
| Zeolite, Unit Cell Size, Å | 24.35 |
| Surface Area, m$^2$/g | 250 |
| Pore Volume, cc/g | 0.60 |

TABLE 6-continued

SMALL CRYSTAL USY CATALYST PROPERTIES

| | |
|---|---|
| Packed Density, g/cc | 0.67 |
| Chemical Composition: | |
| Nickel, wt % | 4.2 |
| Tungsten, wt % | 15.1 |
| Sodium, ppm | 750 |

EXAMPLE 11

This example describes the preparation of a conventional larger crystal USY catalyst. A large crystal Y zeolite was prepared using a conventional, commercially available NaY zeolite that had a $SiO_2/Al_2O_3$ ratio of 4.9 by chemical analysis. The NaY zeolite was obtained from W. R. Grace and had a particle size of 0.7 to 1.0 microns as determined by Scanning Electron Microscopy. This zeolite was ammonium exchanged at room temperature by slurrying the zeolite in 1.0 M $NH_4NO_3$ for one hour, filtering, and then repeating the exchange. The resulting $NH_4$ exchanged Y zeolite was then steamed in an open crucible for three hours at 510° C. in 100% steam at atmospheric pressure. The ammonium exchange procedure was repeated and the zeolite was again steamed at 510° C. for three hours. The resulting USY zeolite had a unit cell size of 24.36 Å and a sodium content of 0.15%.

EXAMPLE 12

This example describes the preparation of a large crystal USY hydrocracking catalyst. The large crystal USY catalyst was prepared by admixing 200 grams of the USY zeolite from Example 11 with pseudoboehite (Condea, Pural SB) to produce a 50% large crystal USY/50% Alumina mixture on a bone dry basis. The resulting mixture was transformed into an extrudable paste by mulling and adding deionized water. The resulting paste was extruded to yield a 1/16-inch diameter extrudate which was dried at 121° C. for 12 hours and subsequently calcined at 538° C. for three hours in flowing air. The resulting catalyst was impregnated with an ammonium metatungstate solution, dried at 121° C. for three hours and then calcined in flowing air for 3 hours at 538° C. The catalyst was subsequently impregnated with a nickel nitrate hexahydrate solution, dried at 121° C. and calcined a final time at 538° C. in flowing air for three hours. The physical and chemical properties of the finished large crystal USY catalyst are shown in Table 7.

TABLE 7

LARGE CRYSTAL USY CATALYST PROPERTIES

| | |
|---|---|
| Zeolite/$Al_2O_3$ ratio, wt | 50:50 |
| Zeolite Crystal Size, microns | 0.7 to 1.0 |
| Zeolite, Unit Cell Size, Å | 24.36 |
| Surface Area, m2/g | 260 |
| Pore Volume, cc/g | 0.61 |
| Packed Density, g/cc | 0.69 |
| Chemical Composition: | |
| Nickel, wt % | 4.1 |
| Tungsten, wt % | 15.7 |
| Sodium, ppm | 700 |

EXAMPLE 13

This example describes the preparation of a ZSM-48 hydrodewaxing catalyst. A ZSM-48 catalyst was prepared by combining 325 g of a calcined H-form ZSM-48 with 227 g of a commercially produced pseudoboehmite alumina (77 wt % solids). The dry mixture was combined with water to make a paste and then extruded to produce a 1/16-inch 65% ZSM-48/35% $Al_2O_3$ extrudate. This extrudate was calcined in air at 538° C. for three hours and then cooled to room temperature. One hundred grams of the calcined extrudate was impregnated with $Pt(NH_3)_4(NO_3)_2$ using an aqueous incipient wetness technique to produce a catalyst containing 0.6 wt % Pt. This catalyst was identified as Pt/ZSM-48/$Al_2O_3$.

EXAMPLE 14

This example describes the preparation of a ZSM-23 hydrodewaxing catalyst. The ZSM-23 zeolite was synthesized according to the method described in US Pat. No. 4,619,820. The ZSM-23 catalyst was prepared by combining 325 g of a calcined H-form ZSM-23 with 227 g of a commercially produced pseudoboehmite alumina (77 wt % solids). The dry mixture was combined with water to make a paste and then extruded to produce a 1/16-inch 65% ZSM-23/35% $Al_2O_3$ extrudate. This extrudate was calcined in air at 538° C. for three hours and then cooled to room temperature. One hundred grams of the calcined extrudate was impregnated with $Pt(NH_3)_4(NO_3)_2$ using an aqueous incipient wetness technique to produce a catalyst containing 0.6 wt % Pt. This catalyst was identified as Pt/ZSM-23/$Al_2O_3$.

EXAMPLE 15

This example describes the preparation of a ZSM-35 hydrodewaxing catalyst. The ZSM-35 zeolite was synthesized according to the method described in US Pat. No. 4,107,195. A ZSM-35 catalyst was prepared by combining 325 g of a calcined H-form ZSM-48 with 227 g of a commercially produced pseudoboehmite alumina (77 wt % solids). The dry mixture was combined with water to make a paste and then extruded to produce a 1/16-inch 65% ZSM-35/35% $Al_2O_3$ extrudate. This extrudate was calcined in air at 538° C. for three hours and then cooled to room temperature. One hundred grams of the calcined extrudate was impregnated with $Pt(NH_3)_4(NO_3)_2$ using an aqueous incipient wetness technique to produce a catalyst containing 0.6 wt % Pt. This catalyst was identified as Pt/ZSM-35/$Al_2O_3$.

EXAMPLE 16

This example describes hydroprocessing and hydrodewaxing a vacuum gas oil using the small crystal USY catalyst and Pt/medium pore zeolite catalysts. A conventional Persian Gulf Vacuum Gas Oil (VGO) with the properties shown in Table 8 below was processed by passing the feed over a commercial NiMo/Alumina hydrotreating (HDT) catalyst with the properties given in Table 9 below and then over sequential beds of the small crystal USY hydrocracking (HDC) catalyst of Example 10 and the ZSM-48, ZSM-23, or ZSM-35 hydrodewaxing (HDW) catalysts of Examples 13, 14 and 15, respectively.

The pilot unit was operated by cascading the effluent from the NiMo/Alumina hydrotreating (HDT) stage to the small crystal USY hydrocracking (HDC) stage and then over each of the ZSM-48, ZSM-23 and ZSM-35 hydrodewaxing (HDW) catalysts, respectively. The volumetric ratios of the catalysts were 0.25 HDT: 0.75 HDC: 1.0 HDW. The catalysts were placed in three different reactors, but all three reactors were maintained at the same temperature. The conditions used for the experiments included temperatures ranging from 370° C. to 415° C., 0.5 to 1.0 LHSV relative to the total volume of HDT/HDC/HDW catalyst. The once-through hydrogen circulation rate was 4000 scf/BBL (712 liter/liter). Hydrogen inlet pressure varied from 2.8 to 10.5 MPa. The results are shown in Tables 10 and 11 below.

TABLE 8

PROPERTIES OF PERSIAN GULF VGO FEEDSTOCK

| | |
|---|---|
| API Gravity | 22.0 |
| Hydrogen, wt % | 12.53 |
| Sulfur, wt % | 2.53 |
| Nitrogen, ppm | 780 |
| Pour Point, ° C. | 38 |
| KV @40° C., cSt. | 74.44 |
| KV @100° C., cSt | 7.121 |
| Composition, wt % | |
| Paraffins | 24.1 |
| Naphthenes | 22.1 |
| Aromatics | 53.8 |
| Distillation, ° C. (D2887) | |
| IBP | 286 |
| 5% | 331 |
| 10% | 351 |
| 30% | 404 |
| 50% | 444 |
| 70% | 486 |
| 90% | 539 |
| 95% | 560 |
| EP | 626 |

TABLE 9

PROPERTIES OF COMMERCIAL HYDROTREATING (HDT) CATALYST

| | |
|---|---|
| Surface Area, m²/g | 138 |
| Pore Volume, cc/g | 0.38 |

TABLE 9-continued

PROPERTIES OF COMMERCIAL HYDROTREATING (HDT) CATALYST

| | |
|---|---|
| Avg. Pore Dia., Angstroms | 113 |
| Nickel, wt % | 4.0 |
| Molybdenum | 14.9 |

EXAMPLE 17

This example describes hydroprocessing and hydrodewaxing a vacuum gas oil using the large crystal USY catalyst and Pt/medium pore zeolite catalysts. The conventional Persian Gulf Vacuum Gas Oil (VGO) of Example 16 was processed by passing the feed over the commercial NiMo/Alumina hydrotreating (HDT) catalyst of Example 16 and then over sequential beds of the large crystal USY hydrocracking (HDC) catalyst of Example 12 and the ZSM-48, ZSM-23, or ZSM-35 hydrodewaxing (HDW) catalysts of Examples 13, 14 and 15, respectively.

The pilot unit was operated by cascading the effluent from the NiMo/Almina hydrotreating (HDT) stage to the large crystal USY hydrocracking (HDC) stage and then over each of the ZSM-48, ZSM-23, and ZSM-35 hydrodewaxing (HDW) catalysts, respectively. The volumetric ratios of the catalysts were 0.25 HDT: 0.75 HDC: 1.0 HDW. The catalysts were placed in three different reactors, but all three reactors were maintained at the same temperature. The conditions used for the experiments included temperatures ranging from 370° C. to 415° C., 0.5 to 1.0 LHSV relative to the total volume of HDT/HDC/HDW catalyst. The once-through hydrogen circulation rate was 4000 scf/BBL (712 liter/liter). Hydrogen inlet pressure varied from 2.8 to 10.5 MPa.

Tables 10 and 11 compare the results of the hydroprocessing experiments of Examples 16 and 17.

TABLE 10

COMPARISON OF THE PERFORMANCES OF SMALL AND LARGE CRYSTAL USY HDC CATALYSTS

| Example | 16 | 17 | 16 | 17 | 16 | 17 |
|---|---|---|---|---|---|---|
| Temp. ° C. | 400 | 400 | 397 | 397 | 395 | 395 |
| LHSV | 0.5 | 0.5 | 0.5 | 0.5 | 0.5 | 0.5 |
| Pressure, MPa | 10.5 | 10.5 | 10.5 | 10.5 | 10.5 | 10.5 |
| HDT Catalyst | NiMo/Al$_2$O$_3$ | NiMo/Al$_2$O$_3$ | NiMo/Al$_2$O$_3$ | NiMo/Al$_2$O$_3$ | NiMo/Al$_2$O$_3$ | NiMo/Al$_2$O$_3$ |
| HDC Catalyst | Sm. Xtal USY | Lg. Xtal USY | Sm. Xtal USY | Lg. Xtal USY | Sm. Xtal USY | Lg Xtal USY |
| HDW Catalyst | Pt/ZSM-48 | Pt/ZSM-48 | Pt/ZSM-23 | Pt/ZSM-23 | Pt/ZSM-35 | Pt/ZSM-35 |
| Conv. to 345° C.- | 92% | 92% | 91% | 91% | 91% | 91% |
| C$_5$ minus, wt % | 4.2 | 6.1 | 5.4 | 7.7 | 6.8 | 8.2 |
| C$_6$ to 215° C. | 36.2 | 38.3 | 36.8 | 38.5 | 36.9 | 40.6 |
| 215° C. to 345° C. | 52.1 | 48.1 | 50.1 | 45.8 | 48.3 | 42.7 |
| 345° C. Plus | 7.5 | 7.5 | 7.7 | 8.0 | 8.0 | 8.5 |
| Distillate Pour Pt.** | −40 | −38 | −42 | −42 | −41 | −39 |

**Pour point of 215° C. to 345° C. in degrees C.

TABLE 11

COMPARISON OF THE PERFORMANCES OF SMALL AND LARGE CRYSTAL USY HDC CATALYSTS

| Example | 16 | 17 | 16 | 17 | 16 | 17 |
|---|---|---|---|---|---|---|
| Temp. ° C. | 390 | 390 | 388 | 388 | 385 | 385 |
| LHSV | 1.0 | 1.0 | 1.0 | 1.0 | 1.0 | 1.0 |
| Pressure, MPa | 3.5 | 3.5 | 3.5 | 3.5 | 3.5 | 3.5 |

TABLE 11-continued

COMPARISON OF THE PERFORMANCES OF SMALL AND LARGE
CRYSTAL USY HDC CATALYSTS

| HDT Catalyst | $NiMo/Al_2O_3$ | $NiMo/Al_2O_3$ | $NiMo/Al_2O_3$ | $NiMo/Al_2O_3$ | $NiMo/Al_2O_3$ | $NiMo/Al_2O_3$ |
| --- | --- | --- | --- | --- | --- | --- |
| HDC Catalyst | Sm. Xtal USY | Lg. Xtal USY | Sm. Xtal USY | Lg. Xtal USY | Sm. Xtal USY | Lg Xtal USY |
| HDW Catalyst | Pt/ZSM-48 | Pt/ZSM-48 | Pt/ZSM-23 | Pt/ZSM-23 | Pt/ZSM-35 | Pt/ZSM-35 |
| Conv. to 345° C.- | 64% | 63% | 62% | 63% | 63% | 62% |
| $C_5$ minus, wt % | 2.2 | 2.7 | 2.5 | 2.8 | 3.1 | 2.9 |
| $C_6$ to 215° C. | 14.2 | 16.7 | 15.1 | 17.4 | 15.5 | 18.3 |
| 215° C. to 345° C. | 50.3 | 46.4 | 47.1 | 45.6 | 46.7 | 43.6 |
| 345° C. Plus | 33.3 | 34.2 | 35.3 | 34.2 | 34.7 | 35.2 |
| Distillate Pour Pt.** | −25 | −20 | −25 | −25 | −20 | −20 |

**Pour point of 215° C. to 345° C. in degrees C.

The results in Tables 10 and 11 demonstrate the superiority of the small crystal USY hydrocracking catalyst in producing higher distillate yields with pour points equal to or lower than the large crystal USY hydrocracking catalyst when coupled with medium pore zeolite-based hydrodewaxing catalysts.

Thus, while there have been described what are presently believed to be the preferred embodiments of the present invention, those skilled in the art will realize that other and further embodiments can be made without departing from the spirit of the invention, and it is intended to include all such further modifications and changes as come within the true scope of the claims set forth herein.

We claim:

1. A process for isomerization dewaxing of a hydrocarbon feed under superatmospheric hydrogen conditions comprising contacting said hydrocarbon feed with a catalyst system under hydroprocessing conditions, said catalyst system comprising:
    a) a large pore crystalline molecular sieve having a Constraint Index less than 2, an alpha value less than 100 and an ultimate crystal size of less than 1 micron; and
    b) an intermediate pore crystalline molecular sieve having a Constraint Index greater than 2, an alpha value less than 100, an ultimate crystal size of less than 1 micron and a unidimensional or a non-intersecting two dimensional pore structure;
    wherein a dewaxed product having improved fluidity is produced by contacting said hydrocarbon feed with said catalyst system in an order starting with said large pore crystalline molecular sieve followed by said intermediate pore crystalline molecular sieve, and wherein said hydroprocessing conditions are selected to favor the production of dewaxed middle distillate products boiling in the range of about 165° C. to about 345° C. such that the overall yield of said dewaxed middle distillate products is greater than about 30 wt %.

2. A process for isomerization dewaxing of a hydrocarbon feed according to claim 1, wherein said process is carried out at superatmospheric hydrogen partial pressure.

3. A process for isomerization dewaxing of a hydrocarbon feed according to claim 1, wherein said hydrocarbon feed contains waxy components having a cloud point greater than 0° C., an ASTM D2887 end boiling point exceeding 275° C., and a pour point greater than 5° C.

4. A process for isomerization dewaxing of a hydrocarbon feed according to claim 1, wherein said large pore crystalline molecular sieve is selected from the group consisting of Zeolite Beta, mordenite, USY, ZSM-20, ZSM-4 (omega), zeolite L, VPI-5, SAPO-37, MeAlPO-37 and cloverite.

5. A process for isomerization dewaxing of a hydrocarbon feed according to claim 4, wherein said large pore crystalline molecular sieve is Zeolite Beta.

6. A process for isomerization dewaxing of a hydrocarbon feed according to claim 1, wherein said intermediate pore crystalline molecular sieve is selected from the group consisting of ZSM-22, ZSM-23, ZSM-35, ZSM48, SAPO-11, SAPO-5, MeAlPO-11 and MeAlPO-5.

7. A process for isomerization dewaxing of a hydrocarbon feed according to claim 6, wherein said intermediate pore crystalline molecular sieve is selected from the group consisting of ZSM-23, ZSM48 and SAPO-11.

8. A process for isomerization dewaxing of a hydrocarbon feed according to claim 7, wherein said improved fluidity includes a reduced pour point and/or cloud point relative to said feed.

9. A process for isomerization dewaxing of a hydrocarbon feed according to claim 8, wherein said pour point of said feedstock is reduced by at least 5° C.

10. A process for isomerization dewaxing of a hydrocarbon feed according to claim 1, further comprising catalytically hydrotreating said hydrocarbon feed prior to contacting said catalyst system.

11. A process for isomerization dewaxing of a hydrocarbon feed according to claim 1, wherein said large pore crystalline molecular sieve and said intermediate pore crystalline molecular sieve catalysts are stacked in a layered configuration, or contained in separate reactors.

12. A process for isomerization dewaxing of a hydrocarbon feed according to claim 1, wherein the ratio of said large pore crystalline molecular sieve to said intermediate pore crystalline molecular sieve is from about 5:95 by weight to about 95:5 by weight.

13. A process for isomerization dewaxing of a hydrocarbon feed according to claim 1, wherein said process is carried out in a co-current flow gas-liquid reactor, a countercurrent flow gas-liquid reactor, a sequential two stage reactor or in multiple reactors.

14. A process for isomerization dewaxing of a hydrocarbon feed according to claim 1, wherein the hydroprocessing conditions comprise a temperature of from about 200 to about 485° C., a hydrogen partial pressure of from about 1375 kPa to about 21,000 kPa, a hydrogen circulation rate of from about 100 to about 10,000 scf $H_2$/BBL, and a liquid hourly space velocity (LHSV) of from about 0.1 to about 20 hr$^{-1}$ based on the total volume of catalyst.

15. A process for isomerization dewaxing of a hydrocarbon feed according to clam 1, wherein said large pore crystalline molecular sieve and/or said intermediate pore crystalline molecular sieve are combined with a Group VIII metal selected from the group consisting of Pt, Pd, Ru, Co, Fe, Ir, Rh, Ni, Os and a combination of any of these metals.

16. A process for isomerization dewaxing of a hydrocarbon feed according to claim 1, wherein said large pore crystalline molecular sieve and/or said intermediate pore crystalline molecular sieve are combined with a binder material selected from the group consisting of clay, silica, alumina, silica-alumina, silica-magnesia, silica-zirconia, silica-thoria, silica-berylia, silica-titania, silica-alumina-thoria, silica-alumina-zirconia, silica-alumina-magnesia, and silica-magnesia-zirconia.

17. A process for isomerization dewaxing of a hydrocarbon feed according to claim 16, wherein said binder material is alumina.

18. A process for isomerization dewaxing of a hydrocarbon feed according to claim 1, wherein said large pore crystalline molecular sieve and/or said intermediate pore crystalline molecular sieve are combined with Pt, Pd or a Pt—Pd combination and an alumina binder.

* * * * *